5/13/86 XR 4,588,286

United States Patent [19]

Stockburger et al.

[11] Patent Number: 4,588,286

[45] Date of Patent: May 13, 1986

[54] COPYING APPARATUS WITH USE REGISTERING MEANS

[76] Inventors: Hermann Stockburger, Kirnachweg 7, D-7742 St. Georgen; Hans-Georg Winderlich, Alban-Dold-Str. 1, D-7730 Villingen-Schwenningen, both of Fed. Rep. of Germany

[21] Appl. No.: 712,406

[22] Filed: Mar. 15, 1985

[30] Foreign Application Priority Data

Mar. 23, 1984 [DE] Fed. Rep. of Germany ....... 3410774

[51] Int. Cl.[4] ............ G03B 27/52

[52] U.S. Cl. ............ 355/40; 355/133; 235/380; 235/382

[58] Field of Search ............ 355/40, 133, 14 R; 235/380–382

[56] References Cited

U.S. PATENT DOCUMENTS 4,533,237 8/1985 Stockburger .................. 355/133 X

FOREIGN PATENT DOCUMENTS 3012860 10/1981 Fed. Rep. of Germany .

*Primary Examiner*—L. T. Hix
*Assistant Examiner*—Della Rutledge
*Attorney, Agent, or Firm*—Donald Brown

[57] ABSTRACT

In a copying apparatus the original and an information characterizing the user is recorded in addition to the copy to be generated for registering the use of the copying apparatus. In order to prevent the original copy to be replaced by a non-recorded other original after recording the original copy comparator means are provided for comparing the recorded original with the original at the respective copying process and interrupting the copying process in case of differences.

3 Claims, 6 Drawing Figures

COPYING APPARATUS WITH USE REGISTERING MEANS

BACKGROUND OF THE INVENTION

The invention refers to a copying apparatus recording the original together with a user characterizing information in addition to the copy to be generated and prior to the generation thereof and storing the record for registering the use of the copying apparatus. A copying apparatus of this kind is described in the German patent No. 31 32 633.1. Thereby a record of the original having a user characterizing information marked thereon is generated in a first step and thereupon the desired number of copies of the same original is produced. The copying apparatus comprises covering means in the form of a cover which is flapped on top of the original to be copied. The covering means is designed to be lockable during the production of the desired amount of copies such that it is assured that all copies are made from the same original. However, the application of this solution is difficult whenever the original is a thick book or the like.

OBJECTS OF THE INVENTION

It is a primary object of the invention to provide an improved copying apparatus. It is a further object of the invention to provide a copying apparatus of the type described above which is designed to guarantee that the original for the total amount of the copies to be generated from an original is copied from the same original, without the mentioned lockable cover being necessary.

SUMMARY OF THE INVENTION

In accordance with the invention the copying apparatus in which for registering the use thereof an original together with a user characterizing information is recorded in addition to the copy to be generated and prior to the generation thereof and this record is stored, comprises a support for receiving an original to be copied, copying means, control means, a station for introducing user representative data and comparing means for comparing at least a portion of the original when recording or of the record thereof with the respective copy portion and for providing an output signal to the control means causing an interruption of the copying process in case of a lacking predetermined amount of coincidence between the respective portions.

BRIEF DESCRIPTION OF THE DRAWINGS

Further features and aspects of the invention emerge from the description of embodiments with reference to the Figures. In the Figures.

Figure 1:
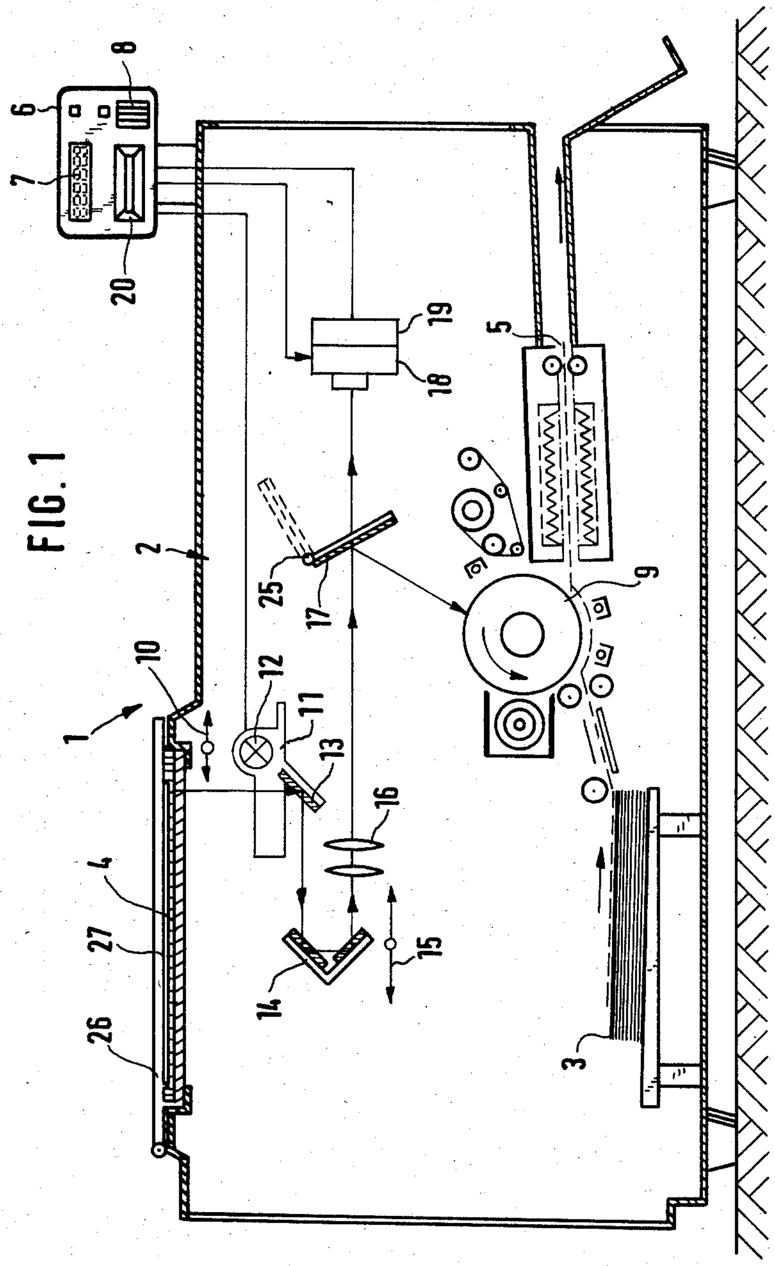
FIG. 1 shows a diagrammatic sectional representation of an inventive copying apparatus.
Figure 2:
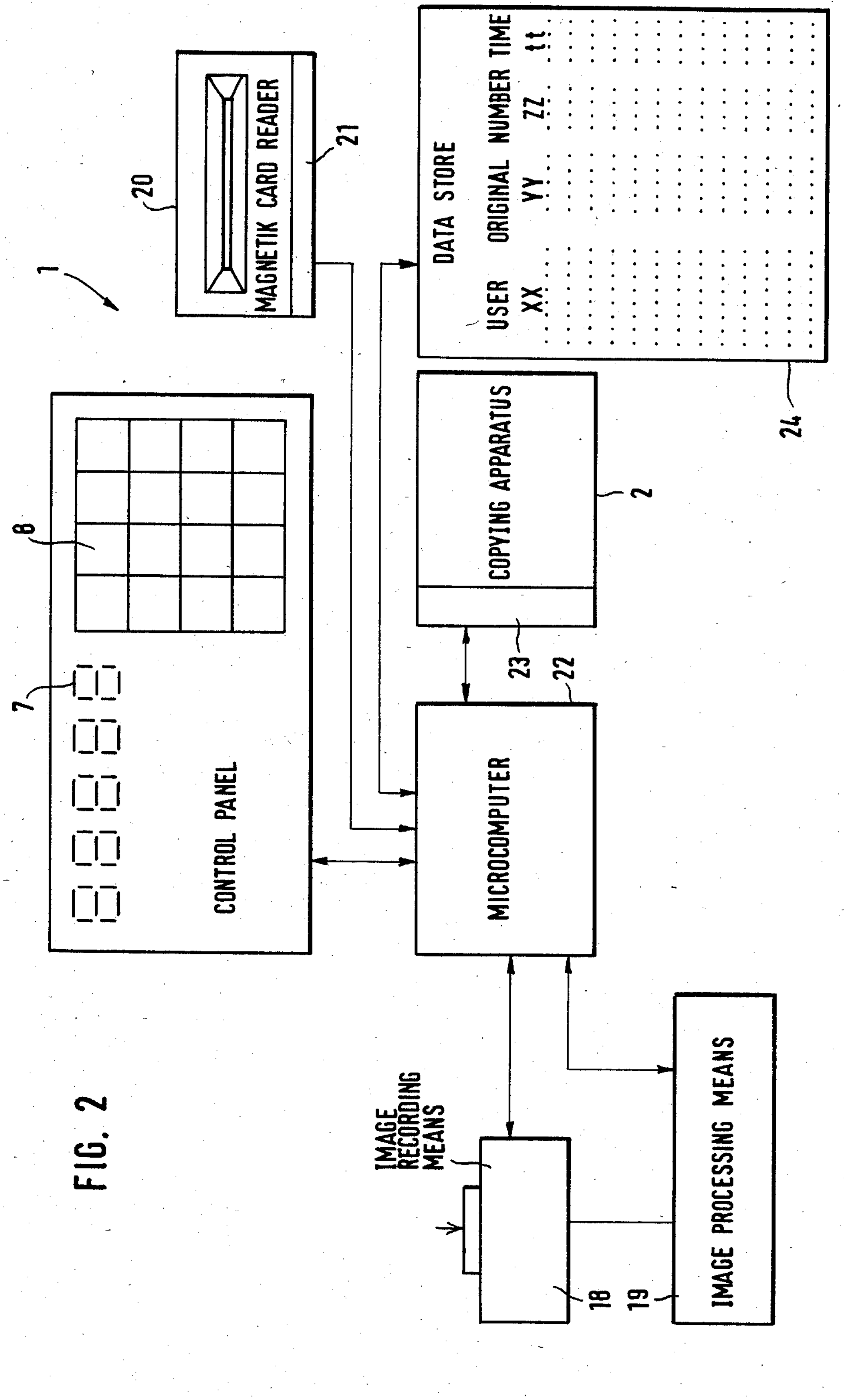
FIG. 2 shows a schematic block diagram for explaining the invention.

In the copying apparatus 1 shown in FIG. 1 the front wall facing the user is omitted for clarity. In conventional manner the copying apparatus 1 comprises a copying means 2 of a conventional type, a paper supply station 3 for supplying paper to the copying means and a support 4 for the originals to be reproduced with the copying apparatus 1. The outlet side of the copying means 2 is followed by a conveying channel 5 for outputting a generated copy in the usual manner. A control panel 6 having a display 7 and a keyboard 8 for starting the copying operation and for inputting informations is provided at the copying apparatus. The actual control means with the data processing means is integral with the control panel 6. In conventional manner the copying means 2 comprises a drum 9 as an intermediate image carrier, a coloring station and a fixing station. In addition the actual imaging apparatus is provided comprising a lamp sledge 11 with lamps 12 being reciprocable in the direction of an arrow 10 parallel to the support 4. A deflection mirror 13 is secured to the lamp sledge 11 to be reciprocable therewith parallel to the support 4. Spaced from the lamp sledge 11 is a pair of deflecting mirrors 14 which are movable parallel to the lamp sledge 11 and simultaneously therewith in direction of an arrow 15, the speed of the deflection mirror 15 being half of the speed of the lamp sledge 11. A lens 16 is arranged in the light path behind the deflection mirror pair 14. This lens is stationarily connected with the machine frame in a manner not shown. From the lens 16 the light path passes through a further deflection mirror 17 to the drum 9. This imaging apparatus will generate an intermediate image of an original to be copied on the drum 9.

The deflection mirror 17 is designed as a partly transparent mirror. In extending the light path from the lens 16 to the deflection mirror 17 an image recording means 18 is aligned with the optical axis of the light path. The image recording means 18 is connected with image processing means 19. The image recording means and the image processing means are designed such that an image recorded in a prior recording operation is compared with a respective image to be recorded subsequently with respect to a predetermined degree of correlation.

In addition to the display 7 and the keyboard 8 for starting the copying apparatus or for inputting informations, respectively, the control panel 6 comprises a terminal 20 for receiving and processing authorization cards similar to cheque cards. The terminal 20 comprises a controller 21 connected with a micro computer 22. The micro computer 22 is connected with the display 7 on the one hand and with a controller 23 for the copying means 2 on the other hand. Furthermore, the micro computer 22 is connected with the image recording means 18 for a control thereof and in addition thereto with the image processing means 19.

In a conventional manner the authorization card is designed to contain the data for the authenticity check, i.e. for providing evidence that the card is among the allowed cards, as well as for identification, i.e. for providing evidence with respect to whom the card was delivered, to be read out by the terminal 20, preferably in coded form on a magnetic track. Furthermore, the authorization card comprises conventional adjustment members by which the authorized user may adjust a code word only known to himself in the form of a memorized number and/or memorized word. The adjustment of the adjustment members made by the user may be detected by the terminal 20. The personal code words may be stored in the micro computer 22. However, it is also possible to mark the authenticity data resulting from the adjustment of the adjustment members on each authorization card in a manner to be read out by the terminal, so that the terminal 20 and the micro computer 22 will compare the data concerning the personal code word marked on the authorization card eventually in coded form with the actual adjustment of the adjustment members. In case of coincidence it will be assumed that the user is actually the authorized person.

After detection that the user is the authorized person the copying operation can be started through the keyboard 8. Thereby the original placed on the support 4 is recorded in the image recording means 18 through the partly transparent mirror 17 in a first step. In addition thereto this record is stored in a store 24 together with the user characterizing data inputted by means of the authorization card and for example characterizing the time of use.

After the first stored record has been made the number of further copying operations required by the desired amount is enabled by the micro computer 22 via the controller 23. In every subsequent copying operation, in which copies are generated in conventional manner, simultaneously a detection of the images generated from the originals to be copied is made through the partly transparent mirror 17. The image of each individual copying operation is detected by the image recording means 18 and checked for correlation with the prior recorded image by the image processing means 19. The copying operation goes on undisturbed if a predetermined degree of coincidence is obtained. However, if the predetermined degree of coincidence is not obtained e.g. because the prior recorded original is replaced by a different original in the further copying operations or because a different original is slipped below a portion of the original copy, then the image processing means 19 provides an interrupt signal via the micro computer 22 to the controller 23, whereupon the copying apparatus is instantaneously stopped and the copying operation is interrupted.

In the above described embodiment the mirror 17 is formed as a partly transparent mirror. However, a different embodiment may be selected in which the mirror 17 is a usual reflecting mirror. In this case the mirror 17 is moved around an axis 25 into the position shown with dotted lines in FIG. 1 for recording the image and into the position shown with full lines during the copying operation.

It will be apparent from the above description that it is obtained by the invention that a replacement of the originals during the copying operation is impossible without instantaneously interrupting the copying operation also in the case that a cover 26 is not locked during the copying operations.

Figure 3:
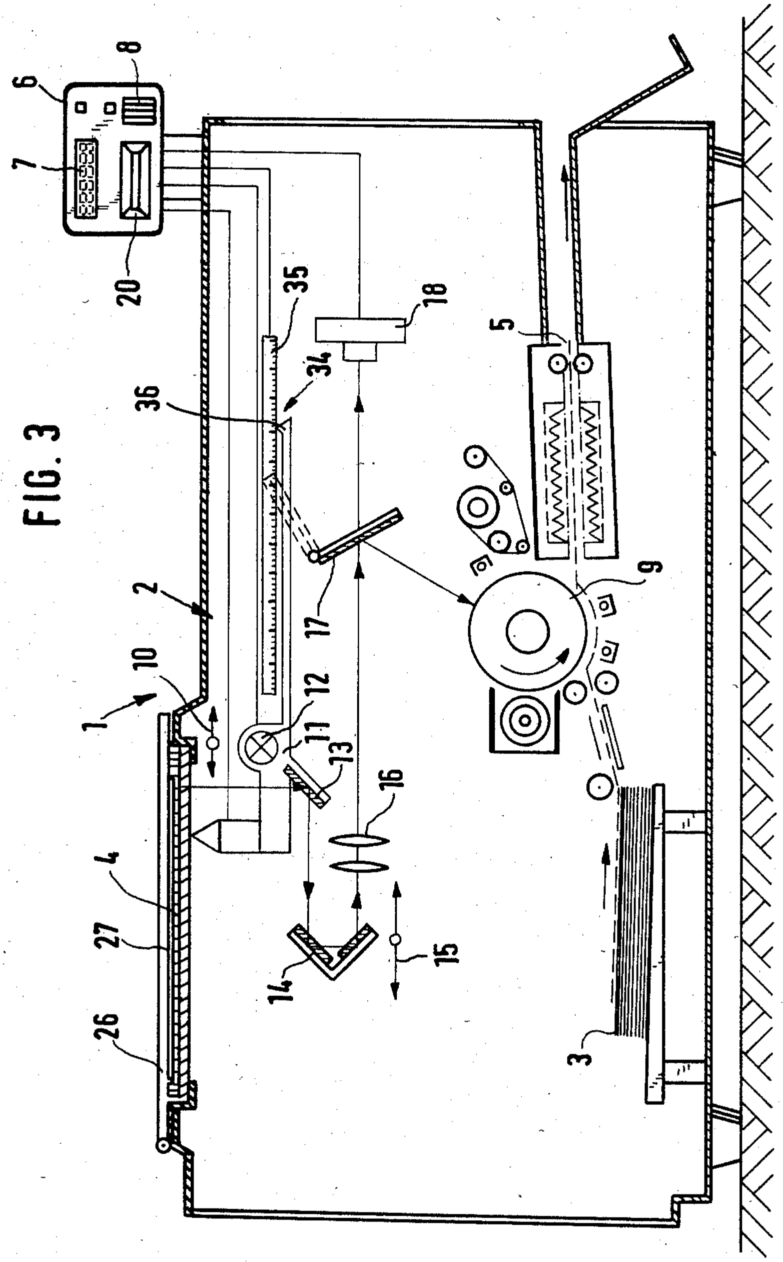
FIG. 3 shows a modified embodiment.
Figure 4:
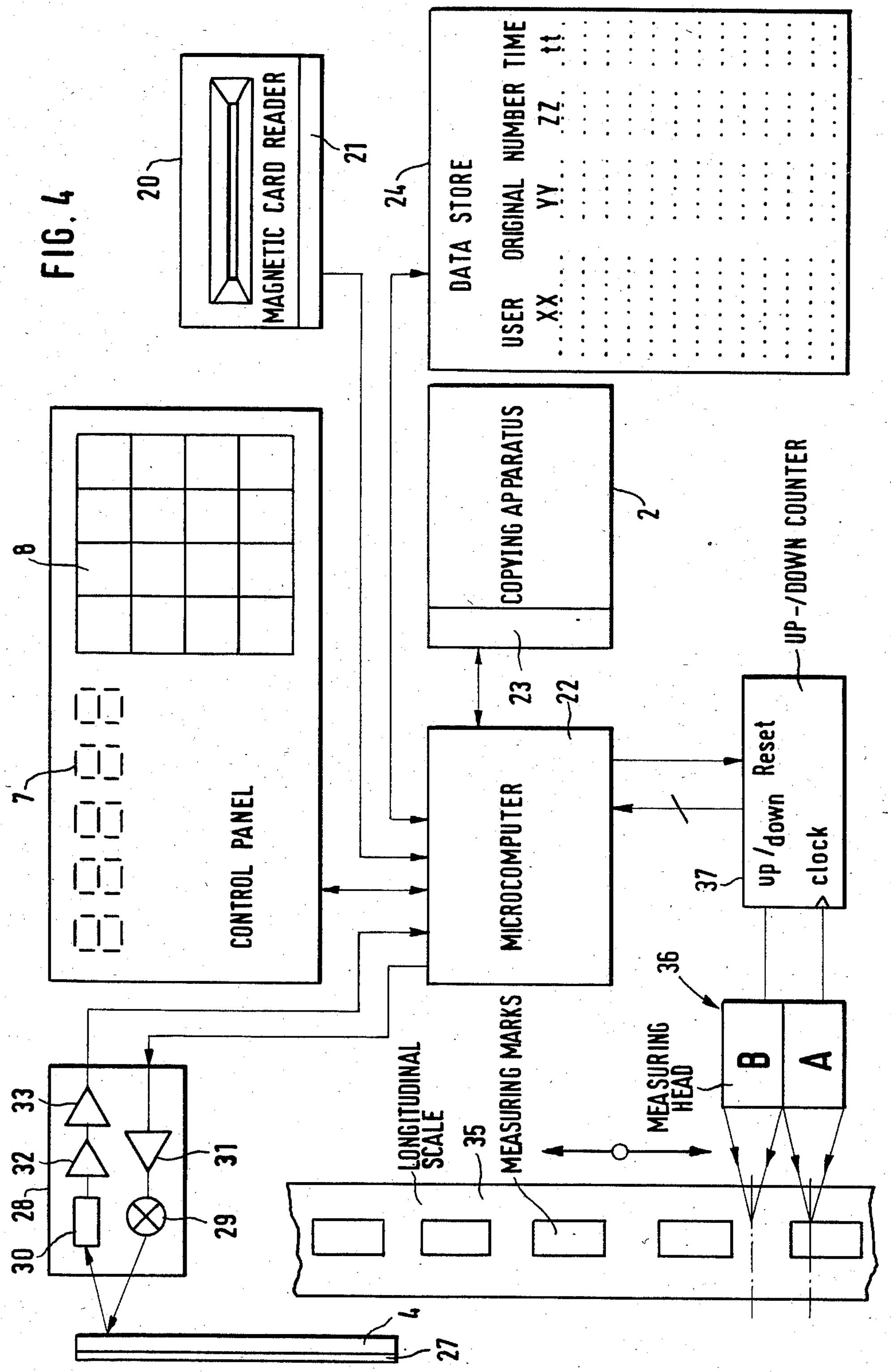
FIG. 4 shows a block diagram for explaining the embodiment shown in FIG. 3.

In the embodiment shown in Fig. 3 a sensor 28 detecting an original 27 placed on the support 4 is secured to the lamp sledge 11. The sensor 28 comprises a light source 29 for illuminating the original 27 placed on the support and a light detector 30 for receiving the light reflected from the illuminated area of the original. A power amplifier 31 is provided at the inlet side of the lamp 29. The lamp is driven by the micro computer 22. The output of the light detector 30 leads to a signal amplifier 32 which is connected with the micro computer 22 via a threshold value amplifier 33.

In addition an instrument 34 for measuring gaugeing lengths of conventional design is provided. It comprises a longitudinal scale 35 being stationarily disposed in a direction parallel to the movement of the lamp sledge and hence of the sensor 28. The instrument further comprises a measuring head 36 which is fixedly secured to the lamp sledge and hence to the sensor 28 and which detects the respective position of the sensor 28 relative to the longitudinal scale in the movement of the lamp sledge and the sensor. It provides an output signal to the micro computer 22 via an up/down counter.

In operation at first a record together with user representative data is recorded by the image recording means 18 or a data store 24, respectively, after the start in the same manner as in the first embodiment. In addition the sensor 28 scans reflectivity values at preadjusted measuring points relative to the longitudinal scale S5 at the first recording operation and the reflectivity values are stored. In each subsequent copying operation for releasing the actual copies the same measuring points are scanned and the measurement results are compared with the prior stored measuring results. If a predetermined correlation is obtained the individual copying operations go on undisturbed. However, if a predetermined degree of coincidence is not obtained, e.g. because the original copy has been replaced by a different original, the micro computer outputs a signal via the controller 23 which immediately stops the copying operation.

Figure 5:
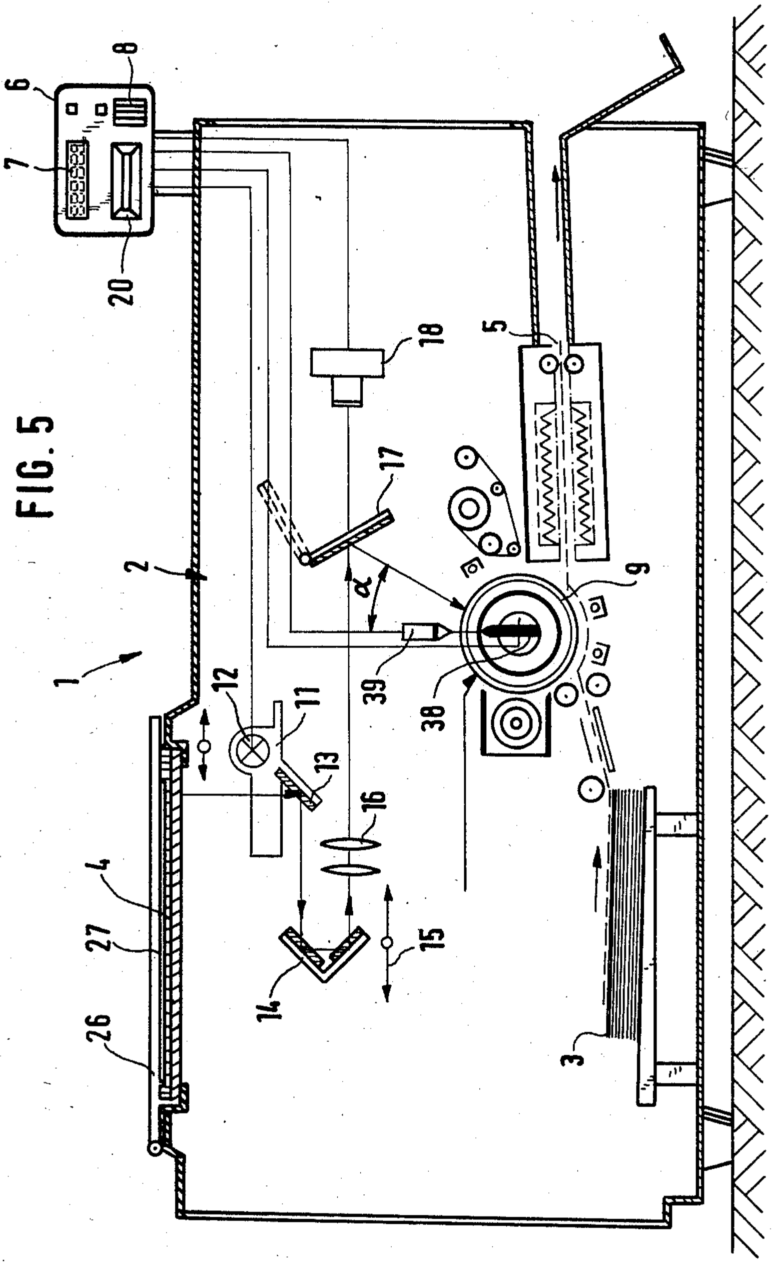
FIG. 5 shows a further modified embodiment.
Figure 6:
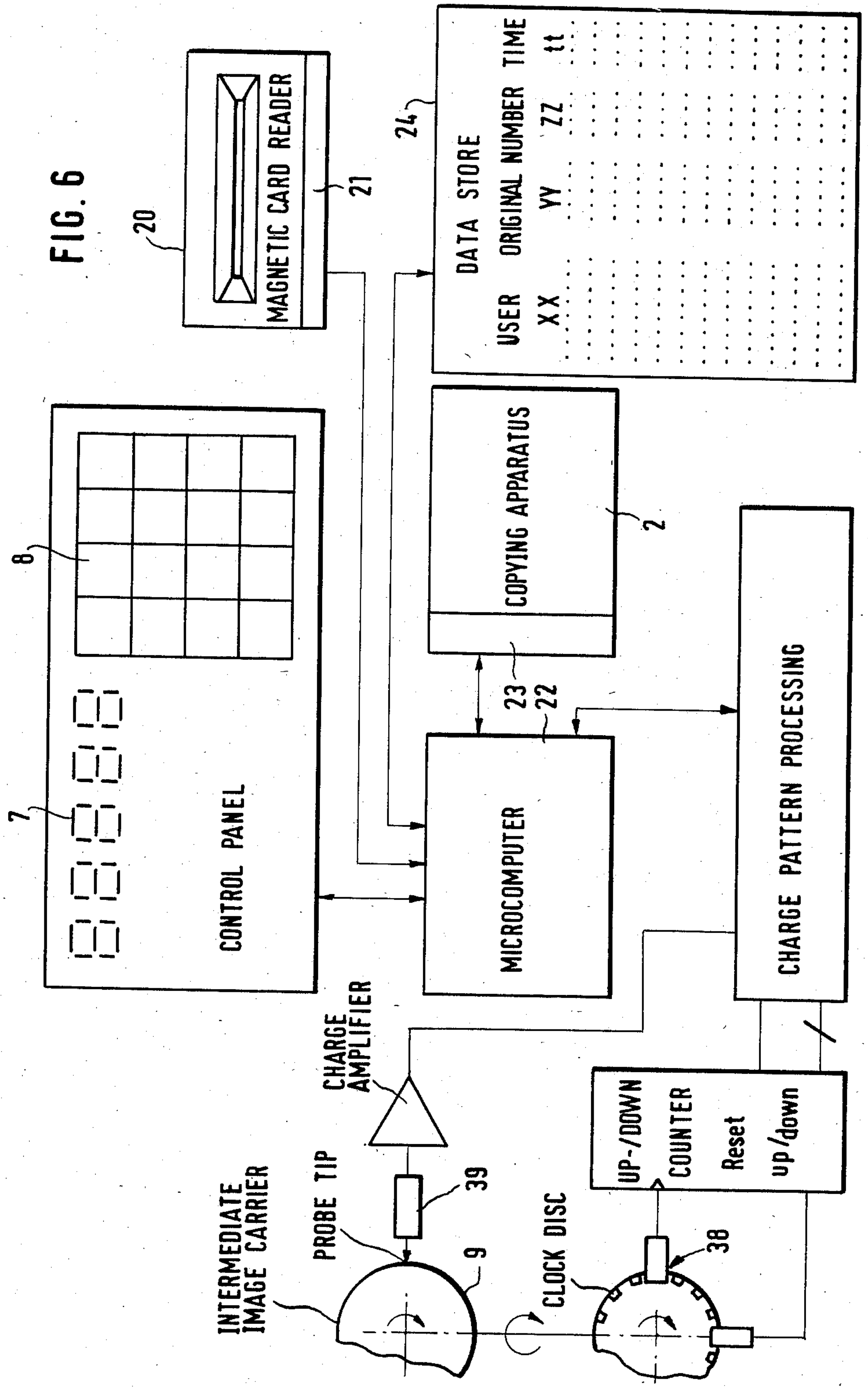
FIG. 6 shows a block diagram for explaining the embodiment shown in FIG. 5.

The embodiment shown in the FIGS. 5 and 6 comprises an angular position pick-up 38 being angularly fixed to the drum 9 and providing at its output signals indicating the respective angular position to the micro computer 22. In addition a sensor 39 formed as a charge detector for detecting the charge pattern is disposed spaced from the drum 9. This sensor 39 is as well connected with the micro computer and is controlled by position signals received from the angular position pick-up such that the sensor performs measurements at respective predetermined angular positions and provides the obtained measurement signals to the micro computer. The signals obtained at the first recording operation are stored in the store 24. In every subsequent copying operation for generating the actual amount of copies a respective comparing measurement is made by the sensor 39. If a predetermined correlation is obtained the copying operations are continued undisturbed. However, if a predetermined degree of coincidence is not obtained, because the original copy has been replaced by a different original, then the micro computer provides a signal stopping the copying operation via the controller 23. It will be evident that in this embodiment shown in the FIGS. 5 and 6 the relative position of the charge pattern and the charge at determined positions of the drum is used for the correlation measurement.

It should be understood that the above description is in no way limitative and that many modifications may be brought to the embodiments disclosed without departing from the true spirit of the invention.

What is claimed is:

1. Copying apparatus in which for registering the use thereof an original together with a user characterizing information is recorded in addition to the copy to be generated and prior to the generation thereof and this copy is stored, comprising a support for receiving an original to be copied, copying means, control means, a station for introducing user representative data and comparing means for comparing at least a portion of the original when recording or of the record thereof with the respective copy portion and for providing an output signal to the control means causing an interruption of the copying process in case of a lacking predetermined amount of coincidence between the respective portions.

2. The copying apparatus of claim 1, comprising a sensor for scanning at least a portion of the support, the sensor being movable relative to the support and therealong, and means for measuring the position of the sensor relative to the support, said measuring means providing output signals which are supplied to a store or the comparing means, respectively.

3. The copying apparatus of claim 1, comprising a sensor for scanning at least a portion of an intermediate image generated in the image formation, the output signal of said sensor being supplied to the comparing means.

* * * * *